(12) United States Patent
Venkatraman et al.

(10) Patent No.: US 10,942,672 B2
(45) Date of Patent: Mar. 9, 2021

(54) DATA TRANSFER METHOD AND APPARATUS FOR DIFFERENTIAL DATA GRANULARITIES

(71) Applicant: Intel Corporation, Santa Clara, CA (US)

(72) Inventors: Shrinivas Venkatraman, Folsom, CA (US); Eng Hun Ooi, Georgetown (MY); Sahar Khalili, Vancouver (CA); Dimpesh Patel, Surrey (CA); Kuan Hua Tan, Coquitlam (CA)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/422,827

(22) Filed: May 24, 2019

(65) Prior Publication Data

US 2019/0278513 A1 Sep. 12, 2019

(51) Int. Cl.
*G06F 13/16* (2006.01)
*G06F 3/06* (2006.01)
*G06F 13/42* (2006.01)

(52) U.S. Cl.
CPC .......... *G06F 3/0656* (2013.01); *G06F 3/0611* (2013.01); *G06F 3/0658* (2013.01); *G06F 13/4282* (2013.01); *G06F 3/0679* (2013.01); *G06F 2213/0026* (2013.01)

(58) Field of Classification Search
None
See application file for complete search history.

(56) References Cited

U.S. PATENT DOCUMENTS

| 7,370,133 | B2 * | 5/2008 | Iyer | G06F 13/1689 |
| | | | | 710/22 |
| 9,535,870 | B2 * | 1/2017 | Vucinic | G06F 13/4282 |
| 2011/0161754 | A1 * | 6/2011 | Baptist | G06F 12/0813 |
| | | | | 714/718 |

\* cited by examiner

*Primary Examiner* — Cheng Yuan Tseng
(74) *Attorney, Agent, or Firm* — Schwabe, Williamson & Wyatt, P.C.

(57) ABSTRACT

Apparatuses, storage media and methods associated with data transfer, are disclosed herein. In some embodiments, an apparatus for computing comprises: a commit generator and a media write generator. The commit generator is arranged to generate commit indicators correspondingly associated with media slices of a storage media to respectively denote to a storage media controller of the storage media whether to proceed with writing the media slices into the storage media. The media write generator is arranged provide data chunks of the media slices to be written into the storage media, and the associated commit indicators to the storage media controller. A size of each data chunk is smaller than a size of each media slice. Other embodiments are also described and claimed.

20 Claims, 5 Drawing Sheets

DATA TRANSFER METHOD AND APPARATUS FOR DIFFERENTIAL DATA GRANULARITIES

TECHNICAL FIELD

The present disclosure relates to the field of computing. More particularly, the present disclosure relates to method and apparatus for transferring data from host to storage/memory media when access granularity for the host is different from the media.

BACKGROUND

With advances in integrated circuit and storage/memory technology, the capacity of storage/memory media has steadily increased over the years. To-date, it is not uncommon for computing systems to have gigabyte solid state storage/memory media. To improve media access efficiency and storage space utilization, storage space inside a storage/memory media is often divided into large atomic access units (denoted as 'slices'), e.g., 2 KB slices. However, to avoid transferring large amounts of redundant data that is already in media and to reduce the delay for transmitting higher priority data, host writes may use much smaller size, e.g., 512 B. In other words, it often takes multiple host writes to fill one slice of the storage/memory media.

Peripheral Component Interconnect Express (PCIe or PCI-e) is a high-speed serial computer expansion bus standard developed to replace the older PCI, PCI eXtended (PCI-X), and Accelerated Graphics Port (AGP) bus standards. Today, it is the common motherboard interface for personal computers' graphic cards, hard drives, solid state drives (SSD), Wireless Fidelity (Wi-Fi) and Ethernet hardware connections. PCIe has numerous improvements over the older standards, including higher maximum system bus throughput, lower I/O pin count and smaller physical footprint, better performance scaling for bus devices, a more detailed error detection and reporting mechanism (Advanced Error Reporting, AER), and native hot-swap functionality. More recent revisions of the PCIe standard provide hardware support for I/O virtualization.

For PCIe based storage/memory systems, PCIe host often needs to write or read data to/from storage media frequently. Since storage space inside media is often divided into large slices, to avoid transferring large amounts of redundant data that is already in media and to reduce the delay for transmitting higher priority transaction layer packets (TLP) or data link layer packets (DLLP,) PCIe host writes typically use much smaller size for PCIe Memory Write TLPs. Furthermore, for some applications, the host may need to update data in multiple non-contiguous locations within a given media slice.

Hence, a method is required for effective data transfer between a host operating with smaller data units and storage/memory media operating with larger data units, such as between a PCIe host and a PCIe endpoint storage/memory controller.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
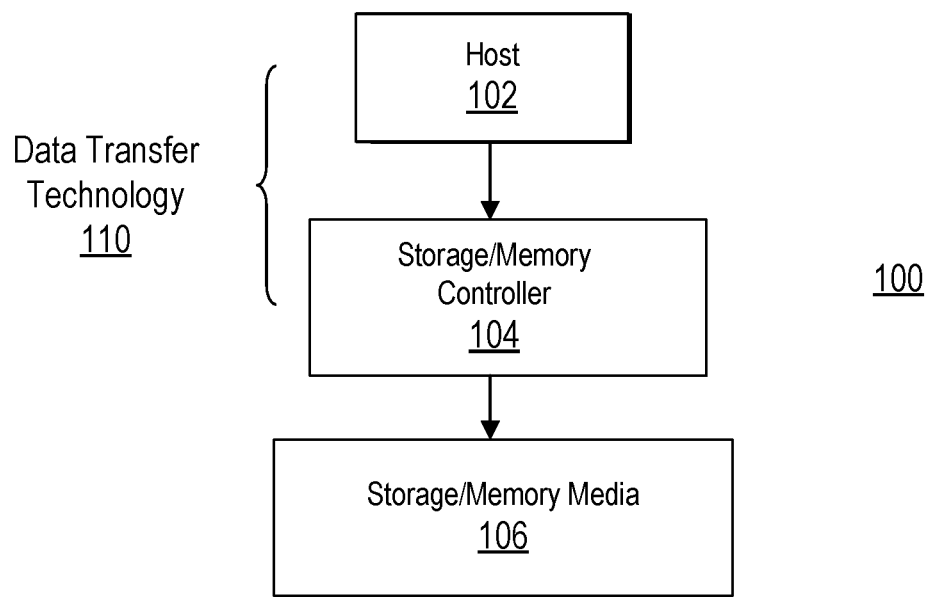
FIG. 1 illustrates an overview of a computing system incorporated with the data transfer technology of the present disclosure for differential data granularities, in accordance with various embodiments.

As noted earlier, it is desirable to shorten the time required to transfer data from a host (such as a PCIe host) to a storage/memory media for a given media atomic access unit. Since write to storage/memory media is done in media atomic access granularity, one of the challenges for such systems would be to determine appropriate time when the storage/memory controller should start to perform media slice write. Therefore, the goal would be to reduce latency for data transfer from host to media, while also making each media write most efficient (substantially eliminates redundant data transfer over media link) by preventing premature flushing. For example, assume that host write size is 512 B and media atomic access size is 2 KB. If the host only wants to transfer one 512 B chunk of data to media, the storage/memory controller should start to perform read-modify-write operation to update this data in the media soon after the memory write (e.g., a PCIe memory write TLP) with 512 B data is received. However, if the host wants to write 2 or 3 chunks of data within a media slice address range, then the storage/memory controller should wait for the memory write with all 2-3 chunks to be received before starting to perform a read-modify-write operation to write this data to media.

Hence, a method is required for effective communication between a host and a storage/memory controller regarding the amount of data that needs to be updated within a media slice and the appropriate time to start transferring the data to media. Furthermore, in the case of PCIe host and storage memory controller, in order to ensure interoperability, it is desirable that the solution is compliant to PCIe specifications, including but is not limited to the latest PCIe Specification V5.0.

To address these challenges, apparatus, method and computer-readable storage medium associated with data transfer technology for differential data granularities are disclosed herein. In various embodiments, a computing system includes a host, a storage/memory controller coupled to the host, and a storage/memory media coupled to and controlled by the storage/memory controller. The host is arranged to operate with data granularity that is smaller than a size of the media slices of the storage/memory media. To facilitate efficient transfer of data between the host and the storage/memory media (via the storage/memory controller), in addition to the data chunks of media slices to be written into the storage/memory media, the host is arranged to further provide commit indicators associated with the media slices to denote to the storage media controller whether to proceed with writing a particular media slice into the storage/memory media.

In various embodiments, where the host and storage/memory controller are PCIe host and storage/memory controller, the PCIe host provides the data chunks to the PCIe storage/memory controller via memory write TLPs, with the associated commit indicator of each media slice stored in a field in the header of the TLP. In various embodiments, the commit indicator of each media slice is stored in a reserved field in the header of the TLP, thereby avoid impacting the functionality of PCIe.

These and other aspects of the data transfer technology of the present disclosure will be further described below with references to the Figures. In the following detailed description, references will be made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

As used herein, the term "module" or "engine" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, wherein an overview of a computing system incorporated with the data transfer technology of the present disclosure for differential data granularities, in accordance with various embodiments, is illustrated. As shown, computing system 100 includes Host 102, Storage/Memory Controller 104 coupled to Host 102, and Storage/Memory Media 106 coupled to and controlled by Storage/Memory Controller 104. Host 102 is arranged to operate with data granularity that is smaller than a size of the media slices of Storage/Memory Media 106. For example, Host 102 may be arranged to operate with data granularity of 512 B, whereas Storage/Memory Media may be arranged to operate with a larger data granularity of 2 KB.

To facilitate efficient transfer of data between Host 102 and Storage/Memory Media 106, via Storage/Memory Controller 104, Host 102 and Storage/Memory Controller 104 are incorporated with data transfer technology of the present disclosure, for differential data granularities. That is, in addition to the data chunks of media slices to be written into storage/memory media, Host 102 is arranged to further provide commit indicators associated with the media slices to denote to Storage/Memory Controller 104 whether to proceed with writing a particular media slice into Storage/Memory Media 106. Storage/Memory Controller 104 is complementarily arranged to proceed with writing a particular media slice into Storage/Memory Media 106 if the associated commit indicator denotes to Storage/Memory Controller 104 to proceed with writing a particular media slice into Storage/Memory Media 106, or if it has received all the data chunks of the media slice. In the event Host 102 provides a commit indicator denoting to Storage/Memory Controller 104 to proceed with writing a particular media slice without providing all the data chunks of the media slice, Storage/Memory Media 106 performs a Read-Modify-Write operation, to retrieve the missing data chunks of the media slice, prior to writing the media slice into Storage/Memory Media 106.

In various embodiments, Host 102 provides the associated commit indicators of the media slices to Storage/Memory Controller 104, together with the data chunks of the media slices. In other embodiments, Host 102 may provide the associated commit indicators of the media slices and the data chunks of the media slices to Storage/Memory Controller 104 separately. In various embodiments, Host 102 provides the associated commit indicators of the media slices and the data chunks of the media slices to Storage/Memory Controller 104 over the same data link. In other embodiments, Host 102 may provide the associated commit indicators of the media slices and the data chunks of the media slices to Storage/Memory Controller 104 over separate links, e.g., over a side channel, for the associated commit indicators.

Except for aspects of data transfer technology 110 incorporated therein, Host 102 and Storage/Memory Controller 104 may be any one of such elements known in the art. Host 102 may include a uni-core or a multi-core processor. Storage/Memory Controller 104 may be any one of a number of volatile or non-volatile storage/memory controllers, including but are not limited to, flash or solid state memory or drive controllers. Similarly, Storage/Memory Media 106 may be any one of a number of volatile or non-volatile storage media, including but are not limited to, flash or solid state memory or drives. Non-volatile memory (NVM) device can include a byte-addressable write-in-place three dimensional crosspoint memory device, or other byte addressable write-in-place NVM devices (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. Sold state drives (SSD) may have form factors of various dimensions and capacities for data center, consumer, professional, or embedded applications.

In various embodiments, Host 102 and Storage/Memory Controller 104 are PCIe host and storage/memory controller. Example embodiments of a computing system with Host 102 and Storage/Memory Controller 104 being PCIe host and storage/memory controller will be further described below with references to FIG. 2.

Except for the data transfer technology of the present disclosure for differential data granularities, computing system 100 may otherwise be any one of a number of computing platforms, devices, and/or systems known in the art, including but are not limited to, wearable devices, smartphones, computing tablets, laptop computers, desktop computers, game consoles, set-top boxes, servers, and so forth. Example embodiments of computing system 100 will be further described below with references to FIG. 4.

Before further describing the data transfer technology for differential data granularities, it should be noted that the success writes from the host may be for different media slices that may or may not be adjacent to each other, or for either contiguous or non-contiguous data chunks of the same media slice.

Figure 2:
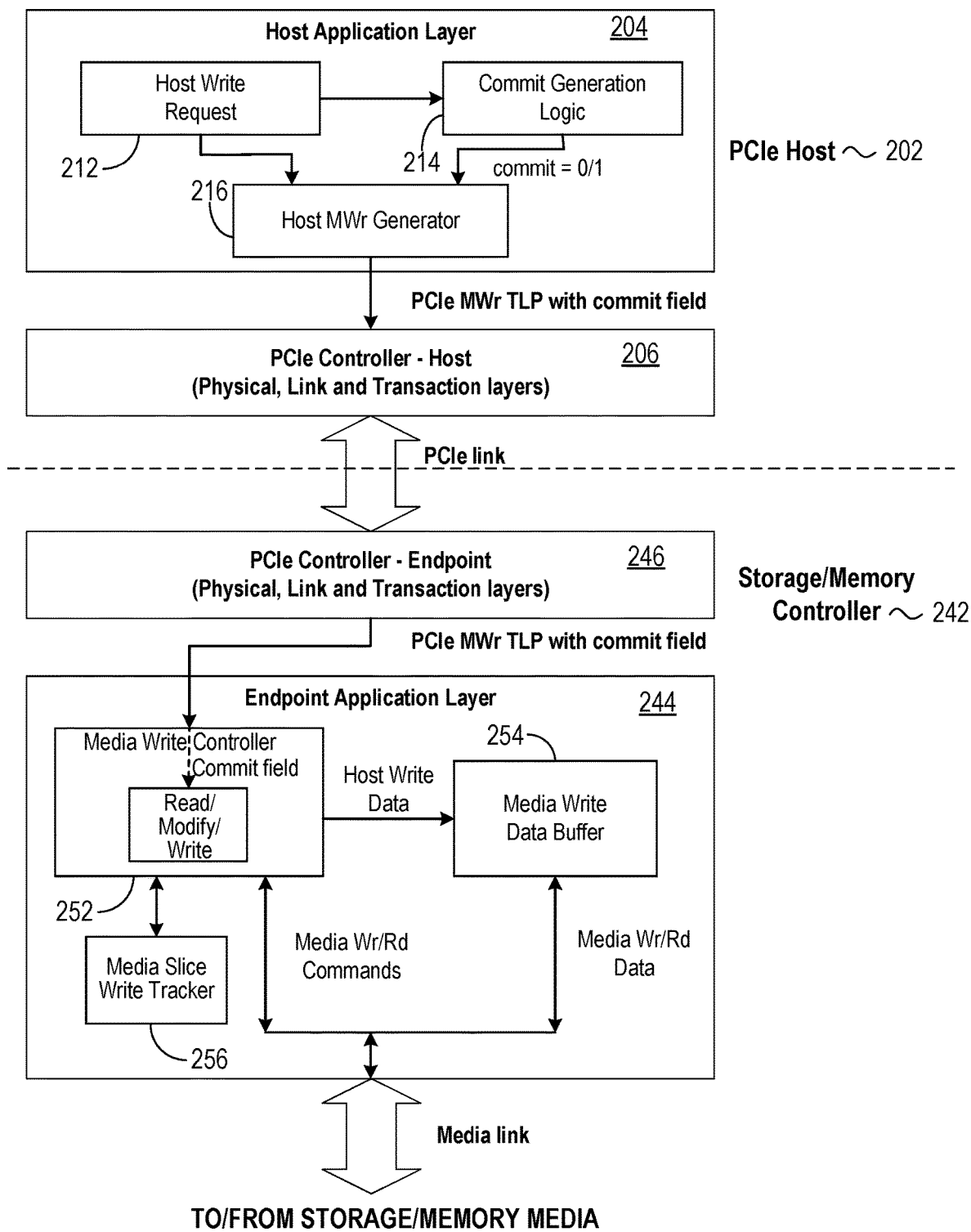
FIG. 2 illustrates a component view of a computing system with a PCIe host and a PCIe storage/memory controller, incorporated with the data transfer technology of the present disclosure for differential data granularities, according to various embodiments.

Referring now to FIG. 2, wherein a component view of a computing system having a PCIe host and a PCIe storage/memory controller, incorporated with the data transfer technology of the present disclosure for differential data granularities, according to various embodiments, is illustrated. As shown, for the illustrated embodiments, computing system 200, which may be computing system 100 of FIG. 1, includes a PCIe Host 202 and a PCIe Endpoint Storage/Memory Controller 242. PCIe Host 202 includes Host Application Layer 204 and PCIe Controller—Host 206, whereas PCIe Endpoint Storage/Memory Controller 242 includes PCIe Controller—Endpoint 246 and Endpoint Application Layer 244.

Host Application Layer 204 of PCIe Host 202 includes Host Write Request Block 212, Commit Generation logic block 214 and Host Memory Write (MWr) Generator 216, communicatively coupled with each other as shown. Host Write Request Block 212 is arranged to initiate a memory write request to write data chunks of a media slice into the storage/memory media controlled by Storage/Memory Controller 242. Host Write Request Block 212 notifies or forwards the memory write request to Commit Generation Logic Block 214 and Host Memory Write (MWr) Generator 216. Commit Generation Logic Block 214 is arranged to track the amount of data chunks written of the various media slices, and generate the corresponding associated commit indicators of the media slices for Host Memory Write Generator 216. The commit indicators denote to Storage/Memory Controller 242 whether the associated media slices are to be written to the storage/memory media it controls. Host Memory Write Generator 216 is arranged to generate the memory write TLPs for Storage/Memory Controller 242, based on the data chunks provided by Host Write Request Block 212 and the commit indicators provided by Commit Generation Logic Block 214. In various embodiments, Host Memory Write Generator 216 is arranged to place the commit indicators in corresponding fields in the headers of the TLPs. In particular, as noted earlier, for PCIe, in various embodiments, the commit indicator of each media slice is stored in a reserved field in the header of the TLP, thereby avoid impacting the functionality of PCIe.

PCIe Controller—Host 206 is arranged to handle all the physical layer, link layer as well as transaction layer tasks for PCIe Host 202, including but not limited to sending the memory write TLPs with data chunks to be written into storage/memory media, and the associated commit indicators of the media slices. In various embodiments, the transaction layer is responsible for the work of packetizing and de-packetizing data and status-message traffic. The data link layer may be subdivided to include a media access control (MAC) sublayer. The physical layer may be subdivided into logical and electrical sublayers. Further, the physical logical-sublayer may contain a physical coding sublayer (PCS). Except for the data transfer technology of the present disclosure for differential data granularities, PCIe controller—Host 206 may otherwise be any one of a number of host PCIe controllers known in the art.

As described earlier, the successive memory write TLPs from PCIe controller—Host 206 may be directed at different media slices that may or may not be adjacent to each other, or for either contiguous or non-contiguous data chunks of the same media slice.

PCIe Controller—Endpoint 246, similar to PCIe Controller—Host 206, is arranged to handle all the physical layer, link layer as well as transaction layer tasks, except for Storage/Memory Controller 242. These tasks likewise include, but is not limited to receiving the memory write TLPs with data chunks to be written into storage/memory media, and the associated commit indicators of the media slices. Except for the data transfer technology of the present disclosure for differential data granularities, Storage/Memory Controller 242 may otherwise be any one of a number of endpoint PCIe controllers known in the art.

Endpoint Application Layer 244 of Storage/Memory Controller 242 includes Media Write Controller 252, Media Write Buffer 254, and Media Slice Write Tracker 256, coupled with the each other as shown. Media Write Buffer 254 is arranged to buffer the data chunks of media slices to be written to the storage/memory media, until the data chunks are actually written. Media Slice Write Tracker 256 is arranged to track the writing of the various media slices to the storage/memory media. Media Write Controller 252 is arranged to cooperate with Media Write Buffer 254 and Media Slice Write Tracker 256 and control the writing of media slices into the storage/memory media. An example operational flow of Media Write Controller 252 will be further described below with references to FIG. 3.

In various embodiments, each of Host Write Request Block 212, Commit Generation logic block 214 and Host Memory Write (MWr) Generator 216 of Host Application Layer 204 of PCIe Host 202, PCIe Controller—Host 206, PCIe Controller—Endpoint 246, and each of Media Write Controller 252, Media Write Buffer 254, and Media Slice Write Tracker 256 may be implemented in either hardware, software or combination thereof. Hardware embodiments may be implemented with ASIC, or programmable circuits, such as FPGA. Software embodiments may be implemented in any one of a number of programming languages that can be compiled into the assembly code supported by a hardware processor or controller.

Figure 3:
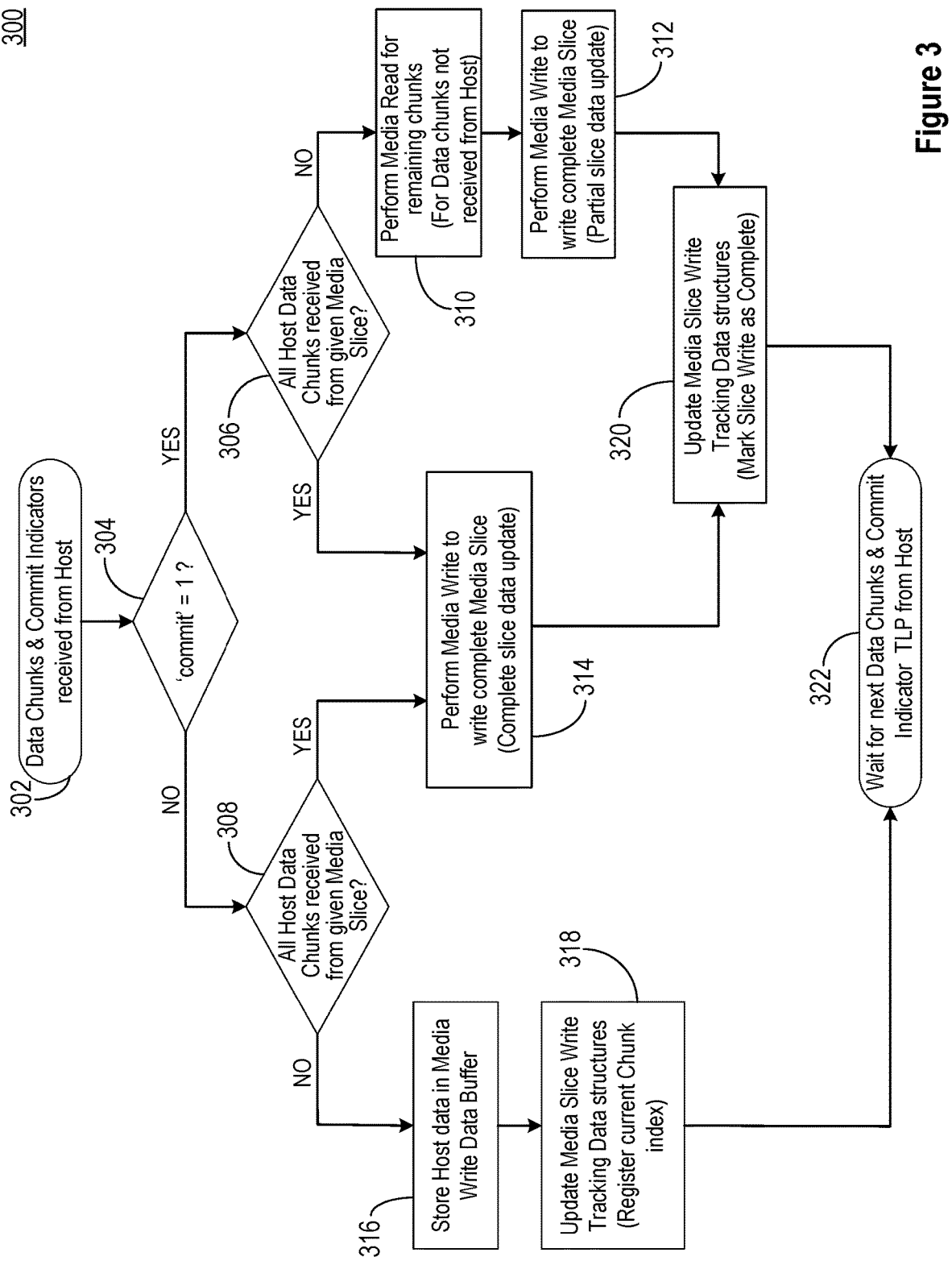
FIG. 3 illustrates an example operation flow of writing data chunks into a storage/memory media with differential data granularities, according to various embodiments.

Referring now to FIG. 3. wherein an example operation flow of writing media slices in a storage/memory media with differential data granularities, according to various embodiments, is illustrated. As shown, for the illustrated embodiment, operation flow 300 for writing media slices in a storage/memory media with differential data granularities includes operations performed at blocks 302-322. In various embodiments, the operations may be performed e.g., by Storage/Memory Controller 106 of FIG. 1 or 242 of FIG. 2, in particular, by Media Write Controller 252 of Endpoint Application Layer 244. In other embodiments, the operation flow may have more or less operations, or having some of the operations performed in different order.

Operation flow 300 starts at block 302. At block 302, data chunks of a media slice and its associated commit indicator are received. Next, at block 304, a determination is made on whether the commit indicator denotes the associated media slice is to be written into the storage/memory media. If a result of the determination at block 304 indicates the commit indicator denotes the associated media slice is to be written into the storage/memory media, operation flow 300 proceeds to block 306, else operation flow 300 proceeds to block 308. At either block 306 or 308, a determination is made on whether all data chunks of the media slice have been received.

If a result of the determination at block 306 indicates that not all data chunks of the media slice have been received, operation flow 300 proceeds to block 310. At block 310, a media read is performed to retrieve from the storage/memory media data chunks that have not been received. Next, at block 312, the media slice (with all data chunks) is written into the storage/memory media. From block 312, operation flow 300 proceeds to block 320. At block 320, the media slice write tracking data structure is updated to reflect the writing of the media slice.

If a result of the determination at either block 306 or block 308 indicates that all data chunks of the media slice have been received, operation flow 300 proceeds to block 314. At block 314, the media slice (with all data chunks) is written into the storage/memory media. From block 314, operation flow 300 also proceeds to block 320, where the media slice write tracking data structure is updated to reflect the writing of the media slice.

If a result of the determination at block 308 indicates that not all data chunks of the media slice have been received, operation flow 300 proceeds to block 316. At block 316, the data chunks are buffered. From block 316, operation flow 300 proceeds to block 318. At block 318, the media slice write tracking data structure is updated to reflect the buffering of the data chunks of the media slice.

From either block 318 or block 320, operation flow 300 proceeds to block 322. At block 322, the current iteration of the operation flow is terminated, and the operation flow waits for the arrival of the next data chunk of a media slice, and the associated commit indicator of the media slice.

Thus, method and apparatus for data transfer with differential data granularities have been described. The method and apparatus potentially offer at least the following advantages:

1. Reduce time, logic and operations required to perform partial or complete update of media slice for storage/memory systems when write granularity for host and media differ.

2. Allow transfer of multiple non-contiguous sectors of data within a given media atomic write unit using minimum number of transactions on a link. This is accomplished by accumulating host data at host atomic access granularity and flushing (writing) them to media in a single media write based on 'commit' field, with media atomic access granularity.

3. Perform above mentioned efficiency improvements while for the PCIe embodiments, maintaining PCIe specification compliance. This allows full re-usability of generic PCIe Endpoint controller (Physical, Link and Transaction layers) design and validation collaterals to improve time to market and ensure interoperability with standard PCIe devices.

Figure 4:
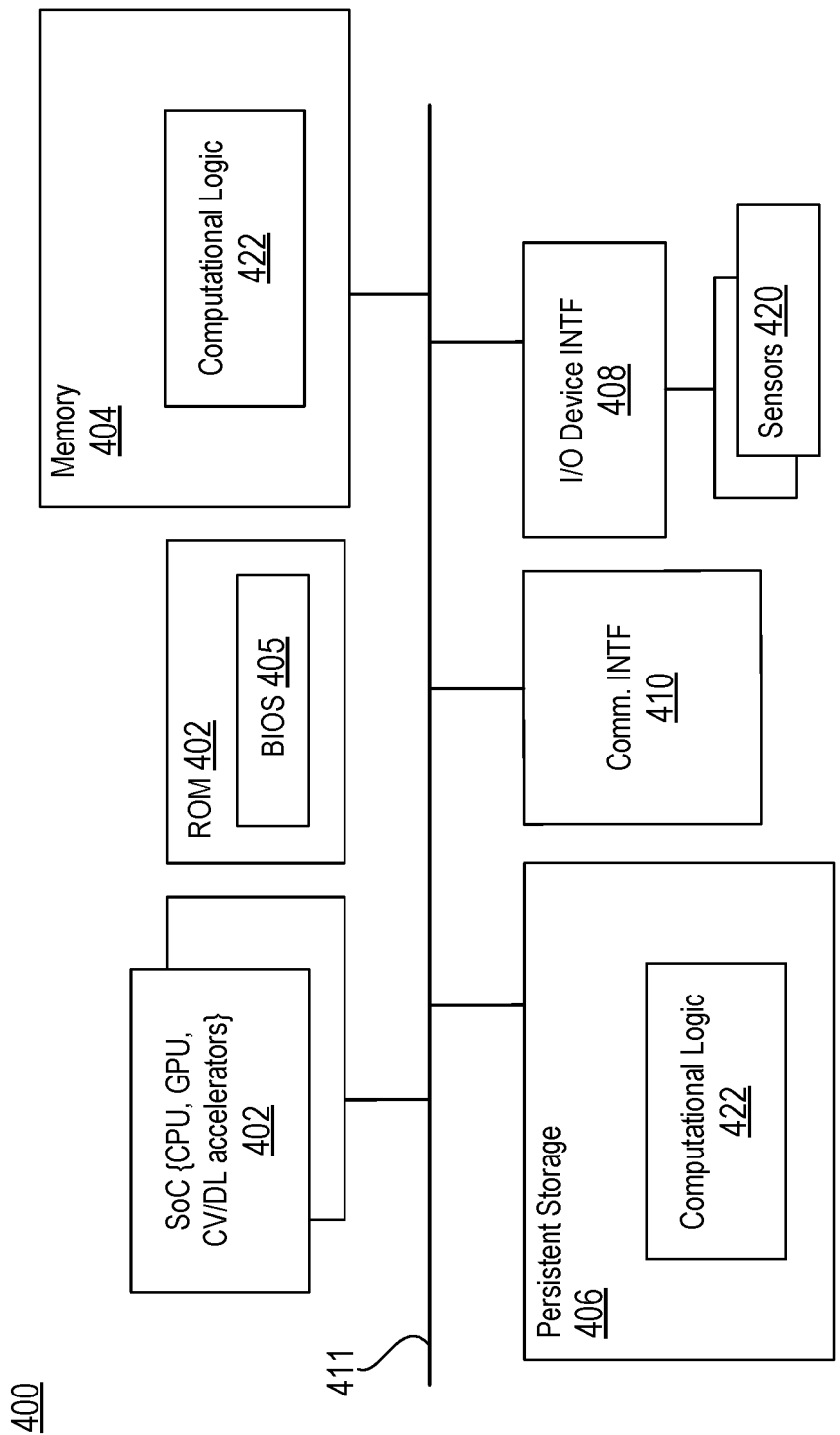
FIG. 4 illustrates a hardware component view of a computer platform, suitable for use to practice the present disclosure, according to various embodiments.

Referring now to FIG. 4, wherein an example computing platform that may be suitable for use to practice the present disclosure, according to various embodiments, is illustrated. As shown, computing platform, device or system 400 (hereinafter, simply computing platform), which may computing system 100 of FIG. 1 or computing system 200 of FIG. 2, include one or more system-on-chips (SoCs) 402, ROM 403 and system memory 404. Each SoCs 402 may include one or more processor cores (CPUs), one or more graphics processor units (GPUs), one or more accelerators, such as computer vision (CV) and/or deep learning (DL) accelerators. ROM 403 may include basic input/output system services (BIOS) 405. CPUs, GPUs, and CV/DL accelerators may be any one of a number of these elements known in the art. Similarly, ROM 403 and BIOS 405 may be any one of a number of ROM and BIOS known in the art. SoC 402 and system memory 404 are arranged to operate with different data granularities, and provided with the data transfer technology of the present disclosure for differential data granularity. Except of the data transfer technology of the present disclosure, SoC 402 and system memory 404 may be any one of a number of SoCs and volatile storage devices known in the art.

Additionally, computing platform 400 may include persistent storage devices 406. Similarly, persistent storage devices 406 is arranged to operate with different data granularity as compared to SoC 402, and is likewise provided with the data transfer technology of the present disclosure for differential data granularities. Example of persistent storage devices 406 may include, but are not limited to, flash drives, hard drives, compact disc read-only memory (CD-ROM) and so forth.

Further, computing platform 400 may include one or more input/output (I/O) interfaces 408 to interface with one or more I/O devices, such as sensors 420. Other example I/O devices may include, but are not limited to, display, keyboard, cursor control and so forth. Computing platform 400 may also include one or more communication interfaces 410 (such as network interface cards, modems and so forth). Communication devices may include any number of communication and I/O devices known in the art. Examples of communication devices may include, but are not limited to, networking interfaces for Bluetooth®, Near Field Communication (NFC), WiFi, Cellular communication (such as LTE 4G/5G) and so forth. The elements may be coupled to each other via system bus 411, which may represent one or more buses. In the case of multiple buses, they may be bridged by one or more bus bridges (not shown). In various embodiments, system bus 411 may include one or more PCIe buses.

Each of these elements may perform its conventional functions known in the art. In particular, ROM 403 may include BIOS 405 having a boot loader. System memory 404 and mass storage devices 4106 may be employed to store a working copy and a permanent copy of the programming instructions implementing the operations associated with an operating system, one or more applications, as well as the controller logic for the data transfer technology of the present disclosure for differential data granularities, collectively referred to as computational logic 922. The various elements may be implemented by assembler instructions supported by processor core(s) of SoCs 402 or high-level languages, such as, for example, C, that can be compiled into such instructions.

Figure 5:
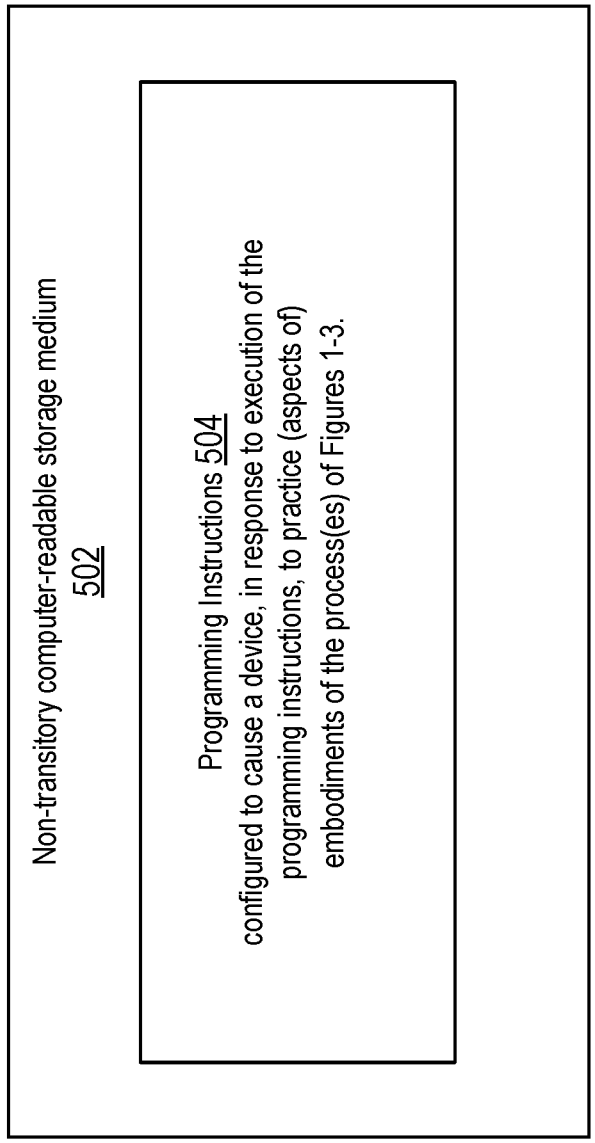
FIG. 5 illustrates a storage medium having instructions for practicing methods described with references to FIGS. 1-3, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure described with references to FIGS. 1-3. As shown, non-transitory computer-readable storage medium 502 may include a number of programming instructions 504. Programming instructions 504 may be configured to enable a device, e.g., computing platform 400, in response to execution of the programming instructions, to implement (aspects of) computing logic 422. In alternate embodiments, programming instructions 504 may be disposed on multiple computer-readable non-transitory storage media 502 instead. In still other embodiments, programming instructions 504 may be disposed on computer-readable transitory storage media 502, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and descriptions, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 is an apparatus for computing, comprising: a commit generator to generate commit indicators correspondingly associated with media slices of a storage media to respectively denote to a storage media controller of the storage media whether to proceed with writing the media slices into the storage media; and a media write generator to provide data chunks of the media slices to be written into the storage media, and the associated commit indicators to the storage media controller; wherein a size of each data chunk is smaller than a size of each media slice.

Example 2 is example 1, wherein the apparatus is a peripheral component interconnect express (PCIe) host; the storage media controller is a PCIe storage media controller; and the media write generator is arranged to generate memory write transaction layer packets (TLP), with a commit field in a header of each TLP, to provide the data chunks of the media slices to be written into the storage media, and the associated commit indicators to the PCIe storage media controller.

Example 3 is an apparatus for computing, comprising: a media write data buffer to buffer data chunks of media slices to be written into a storage media; and a media write controller coupled to the media write data buffer to control writing of the buffered media slices to the storage media; wherein in addition to the data chunks to be written into the storage media, the apparatus is provided with commit indicators correspondingly associated with the media slices to be written into the storage media; and wherein the media write controller is arranged to cause the buffered data chunks of a media slice to be written into the storage media on receipt of the associated commit indicator denoting to proceed with writing the media slice into the storage media; wherein a size of each data chunk is smaller than a size of each media slice.

Example 4 is example 3, wherein the media write controller is arranged to determine whether the associated commit indicator of a media slice denotes to proceed with writing the media slice into the storage media; and determine whether all data chunks of a media slice have been received.

Example 5 is example 4, wherein the media write controller is arranged to further cause the media slice to be written to the storage media, on determination that all data chunks of the media slice have been received.

Example 6 is example 5, wherein the media write controller is arranged to further update a media slice write tracker data structure on causing the media slice to be written to the storage media.

Example 7 is example 4, wherein the media write controller is arranged to further cause remaining data chunks of the media slice to be read from the storage media, on determination that the associated commit indicator of the media slice denotes to proceed with writing the media slice into the storage media, and determination that all data chunks of the media slice have not been received.

Example 8 is example 7, wherein the media write controller is arranged to further cause the media slice to be written to the storage media on reading the remaining data chunks of the media slice from the storage media.

Example 9 is example 8, wherein the media write controller is arranged to further update a media slice write tracker data structure on causing the media slice to be written to the storage media.

Example 10 is example 4, wherein the media write controller is arranged to further cause the data chunks of a media slice to be buffered in the media write data buffer, on determination that the associated commit indicator of the media slice does not denote to proceed with writing the media slice into the storage media, and determination that all data chunks of the media slice have not been received.

Example 11 is example 10, wherein the media write controller is arranged to further update a media slice write tracker data structure on causing the data chunks of a media slice to be buffered in the media write data buffer.

Example 12 is any one of examples 3-11, wherein the apparatus is a peripheral component interconnect express (PCIe) storage media controller; and the data chunks of the media slices to be written into the storage media, and the associated commit indicators are provided to the PCIe storage media controller, by a PCIe host, as memory write transaction layer packets (TLP), with a commit field in a header of each TLP having the commit indicator.

Example 13 is example 12, wherein the commit field is in a reserved filed of the head of each TLP having the commit indicator.

Example 14 is a method for computing, comprising: generating, by a peripheral component interconnect express (PCIe) host, commit indicators correspondingly associated with media slices of a storage media to respectively denote to a storage media controller of the storage media whether to proceed with writing the media slices into the storage media; and generating and providing, by the PCIe host, memory write transaction layer packets (TLP) having the data chunks of the media slices to be written into the storage media, and the associated commit indicators included in headers of the TLP packets, to the storage media controller.

Example 15 is example 14, further comprising: receiving, by the storage media controller, the memory write TLP having the data chunks of the media slices to be written into the storage media, and the associated commit indicators included in headers of the TLP packets; and buffering, by the storage media controller the data chunks of the media slices to be written into the storage media.

Example 16 is example 15, further comprising determining, by the storage media controller, whether the respective associated commit indicators of the media slices denotes to proceed with writing the media slices into the storage media; and determine whether all data chunks of each media slice have been received.

Example 17 is at least one computer-readable medium (CRM) having instructions stored therein, to cause a storage media controller, in response to execution of the instruction by the storage media controller, to: buffer data chunks of media slices to be written into a storage media controlled by the storage media controller; and control writing of the buffered media slices to the storage media; wherein the data chunks to be written into the storage media are provided to the storage media controller via peripheral component interconnect express (PCIe) memory write transaction layer packets (TLP), with headers of the TLP having commit indicators correspondingly associated with the media slices to be written into the storage media; and wherein to control writing comprises to cause the buffered data chunks of a media slice to be written into the storage media on receipt of the associated commit indicator in a header of a TLP denoting to proceed with writing the media slice into the storage media.

Example 18 is example 17, wherein the storage media controller is further caused to determine whether the associated commit indicator of a media slice in a header of a TLP denotes to proceed with writing the media slice into the storage media; and determine whether all data chunks of a media slice have been received.

Example 19 is example 18, wherein the storage media controller is further caused to cause the media slice to be written to the storage media, on determination that all data chunks of the media slice have been received.

Example 20 is example 19, wherein the storage media controller is further caused to update a media slice write tracker data structure on causing the media slice to be written to the storage media.

Example 21 is example 18, wherein the storage media controller is further caused to cause remaining data chunks of the media slice to be read from the storage media, on determination that the associated commit indicator of the media slice in a header of the TLP denotes to proceed with writing the media slice into the storage media, and determination that all data chunks of the media slice have not been received.

Example 22 is example 21, wherein the storage media controller is further caused to cause the media slice to be written to the storage media on reading the remaining data chunks of the media slice from the storage media.

Example 23 is example 22, wherein the storage media controller is further caused to update a media slice write tracker data structure on causing the media slice to be written to the storage media.

Example 24 is any one of examples 18-23, wherein the storage media controller is further caused to cause the data chunks of a media slice to be buffered, on determination that the associated commit indicator of the media slice in a header of the TLP does not denote to proceed with writing the media slice into the storage media, and determination that all data chunks of the media slice have not been received.

Example 25 is example 24, wherein the storage media controller is further caused to update a media slice write tracker data structure on causing the data chunks of a media slice to be buffered in the media write data buffer.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for computing, comprising:
a commit generator to generate commit indicators correspondingly associated with media slices of a storage media to respectively denote to a storage media controller of the storage media whether to proceed with writing the media slices into the storage media; and
a media write generator to provide data chunks of the media slices to be written into the storage media, and the associated commit indicators to the storage media controller;
wherein a size of each data chunk is smaller than a size of each media slice.

2. The apparatus of claim 1, wherein
the apparatus is a peripheral component interconnect express (PCIe) host;
the storage media controller is a PCIe storage media controller; and
the media write generator is arranged to generate memory write transaction layer packets (TLP), with a commit field in a header of each TLP, to provide the data chunks of the media slices to be written into the storage media, and the associated commit indicators to the PCIe storage media controller.

3. An apparatus for computing, comprising:
a media write data buffer to buffer data chunks of media slices to be written into a storage media; and
a media write controller coupled to the media write data buffer to control writing of the buffered media slices to the storage media;
wherein in addition to the data chunks to be written into the storage media, the apparatus is provided with commit indicators correspondingly associated with the media slices to be written into the storage media; and
wherein the media write controller is arranged to cause the buffered data chunks of a media slice to be written into the storage media on receipt of the associated commit indicator denoting to proceed with writing the media slice into the storage media;
wherein a size of each data chunk is smaller than a size of each media slice.

4. The apparatus of claim 3, wherein the media write controller is arranged to determine whether the associated commit indicator of a media slice denotes to proceed with writing the media slice into the storage media; and determine whether all data chunks of a media slice have been received.

5. The apparatus of claim 4, wherein the media write controller is arranged to further cause the media slice to be written to the storage media, on determination that all data chunks of the media slice have been received.

6. The apparatus of claim 5, wherein the media write controller is arranged to further update a media slice write tracker data structure on causing the media slice to be written to the storage media.

7. The apparatus of claim 4, wherein the media write controller is arranged to further cause remaining data chunks of the media slice to be read from the storage media, on determination that the associated commit indicator of the media slice denotes to proceed with writing the media slice into the storage media, and determination that all data chunks of the media slice have not been received.

8. The apparatus of claim 7, wherein the media write controller is arranged to further cause the media slice to be written to the storage media on reading the remaining data chunks of the media slice from the storage media.

9. The apparatus of claim 8, wherein the media write controller is arranged to further update a media slice write tracker data structure on causing the media slice to be written to the storage media.

10. The apparatus of claim 4, wherein the media write controller is arranged to further cause the data chunks of a media slice to be buffered in the media write data buffer, on determination that the associated commit indicator of the media slice does not denote to proceed with writing the media slice into the storage media, and determination that all data chunks of the media slice have not been received.

11. The apparatus of claim 10, wherein the media write controller is arranged to further update a media slice write tracker data structure on causing the data chunks of a media slice to be buffered in the media write data buffer.

12. The apparatus of claim 3, wherein
the apparatus is a peripheral component interconnect express (PCIe) storage media controller; and
the data chunks of the media slices to be written into the storage media, and the associated commit indicators are provided to the PCIe storage media controller, by a PCIe host, as memory write transaction layer packets (TLP), with a commit field in a header of each TLP having the commit indicator.

13. The apparatus of claim 12, wherein the commit field is in a reserved filed of the head of each TLP having the commit indicator.

14. A method for computing, comprising:
generating, by a peripheral component interconnect express (PCIe) host, commit indicators correspondingly associated with media slices of a storage media to respectively denote to a storage media controller of the storage media whether to proceed with writing the media slices into the storage media; and
generating and providing, by the PCIe host, memory write transaction layer packets (TLP) having data chunks of the media slices to be written into the storage media, and the associated commit indicators included in headers of the TLP, to the storage media controller.

15. The method of claim 14, further comprising:
receiving, by the storage media controller, the memory write TLP having the data chunks of the media slices to be written into the storage media, and the associated commit indicators included in headers of the TLP; and
buffering, by the storage media controller, the data chunks of the media slices to be written into the storage media.

16. At least one non-transitory computer-readable medium (CRM) having instructions stored therein, to cause a storage media controller, in response to execution of the instruction by the storage media controller, to:
buffer data chunks of media slices to be written into a storage media controlled by the storage media controller; and
control writing of the buffered media slices to the storage media;
wherein the data chunks to be written into the storage media are provided to the storage media controller via peripheral component interconnect express (PCIe) memory write transaction layer packets (TLP), with headers of the TLP having commit indicators correspondingly associated with the media slices to be written into the storage media; and
wherein to control writing comprises to cause the buffered data chunks of a media slice to be written into the storage media on receipt of the associated commit indicator in a header of a TLP denoting to proceed with writing the media slice into the storage media.

17. The non-transitory CRM of claim 16, wherein the storage media controller is further caused to determine whether the associated commit indicator of a media slice in a header of a TLP denotes to proceed with writing the media slice into the storage media; and determine whether all data chunks of a media slice have been received.

18. The non-transitory CRM of claim 17, wherein the storage media controller is further caused to cause the media slice to be written to the storage media, on determination that all data chunks of the media slice have been received.

19. The non-transitory CRM of claim 17, wherein the storage media controller is further caused to cause remaining data chunks of the media slice to be read from the storage media, on determination that the associated commit indicator of the media slice in a header of the TLP denotes to proceed with writing the media slice into the storage media, and determination that all data chunks of the media slice have not been received.

20. The non-transitory CRM of claim 17, wherein the storage media controller is further caused to cause the data chunks of a media slice to be buffered, on determination that the associated commit indicator of the media slice in a header of the TLP does not denote to proceed with writing the media slice into the storage media, and determination that all data chunks of the media slice have not been received.

* * * * *

UNITED STATES PATENT AND TRADEMARK OFFICE
CERTIFICATE OF CORRECTION

| | |
|---|---|
| PATENT NO. | : 10,942,672 B2 |
| APPLICATION NO. | : 16/422827 |
| DATED | : March 9, 2021 |
| INVENTOR(S) | : Eng Hun Ooi et al. |

It is certified that error appears in the above-identified patent and that said Letters Patent is hereby corrected as shown below:

In the Claims

Column 15
Line 30, "… filed of the head…" should read -- field of the head --

Signed and Sealed this
Eleventh Day of April, 2023

Katherine Kelly Vidal
*Director of the United States Patent and Trademark Office*